United States Patent [19]
Rousse

[11] 3,775,618
[45] Nov. 27, 1973

[54] METHOD AND APPARATUS FOR CHECKING AND/OR CORRECTING RAILWAY TRACKS

[75] Inventor: Robert Rousse, Lausanne, Switzerland

[73] Assignee: Cannon, Inc., Phillipsburg, N.J.

[22] Filed: Aug. 9, 1972

[21] Appl. No.: 279,082

[52] U.S. Cl..................... 250/209, 33/287, 250/224
[51] Int. Cl. ....................... E01b 29/04, G06m 7/00
[58] Field of Search............................ 250/209, 224; 33/287

[56] References Cited
UNITED STATES PATENTS
3,381,626 5/1968 Fagan et al. ...................... 33/287 X
3,675,233 7/1972 Bencsics et al. ................... 33/287 X Primary Examiner—James W. Lawrence
Assistant Examiner—T. N. Grigsby
Attorney—Christopher Robinson et al.

[57] ABSTRACT

This invention is for a method and apparatus for checking and/or correcting a railway track by determining the position of a point P of said track relative to a reference plane containing a reference line defined by two points A and B situated respectively on either side of the normal dropped from point P onto said line, and wherein coherent rays passing through the point A are used to illuminate a target sensitive to there rays positioned at point B said rays being intercepted by a screen connected to point P whereof the shadow produced is projected onto the target B which is swept by rotating the laser beam about an axis parallel to the reference plane and passing through the point A and the target sweep time is measured and the position of point P relative to the reference line AB is determined by treating said sweep time.

12 Claims, 3 Drawing Figures

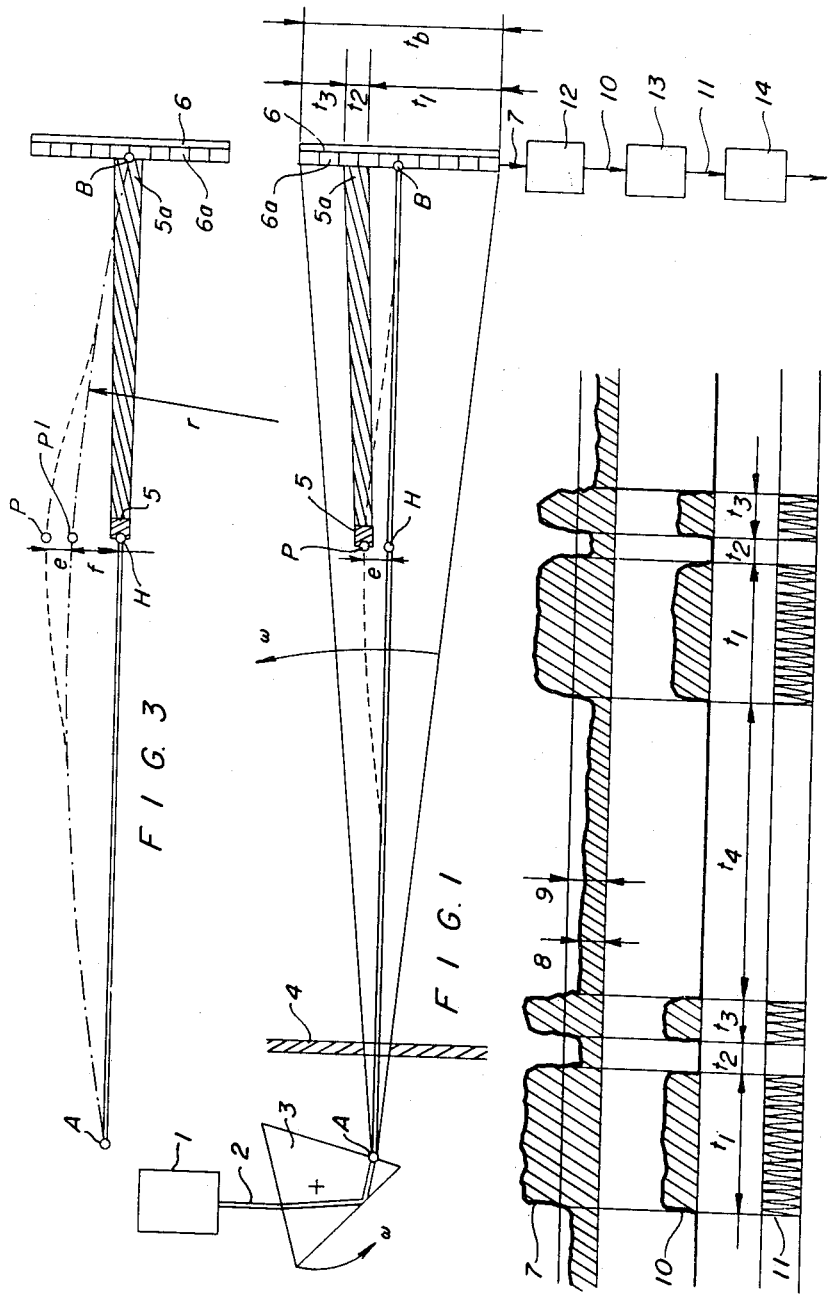

METHOD AND APPARATUS FOR CHECKING AND/OR CORRECTING RAILWAY TRACKS

BACKGROUND OF THE INVENTION

The present invention has for its object on the one hand a process for determining point by point the position of the track relative to a reference line defined by two points joined by a bundle of coherent beams such as lasers and on the other hand a device for performing this process.

Various processes are known wherein laser beams are used to produce a reference base for determining the desired curve. The general principle is as follows: the reference base is defined by two points on the track whereby at one of these points is installed a laser beam source and at the other a target equipped with photoelectric cells. Between these two points is located the point whose position is to be determined and to the right thereof is placed a screen whereof the shadow is projected onto the target which permits by means of a differential amplifier to successively determine the position of each point relative to the reference line.

An orthogonal system of beams permits the measurement of the position variation of each point either in the horizontal plane or in the vertical plane. However various disadvantages are inherent in these processes:
the laser beam must be aimed very accurately at the centre of the target which implies a very precise control of the orientation of the emitter;
for the point by point determination of curve outlines it is indispensable to know exactly the camber at the considered point and the length of the chord. These two measurements have to be performed separately by other means.
the measurement by differential amplifiers of the variable distribution of the lighting of the cells is linked with numerous disturbances such as fluctuations in the atmosphere in a work area excessively heated by the sun, dust unevenly distributed over the cells, the unequal aging of the cells, parasitic radiation, etc.

To eliminate the effect of parasitic radiation it has been proposed that the laser beam be modulated and that the amplifier be selectively harmonised with the modulation frequency. This complicated and delicate process does not however eliminate the other above-indicated disadvantages.

The object of the present invention is to eliminate all the above-indicated disadvantages as well as the resulting errors of the imprecise aiming of the laser beam onto the target and the comparative measurement of the intensity of the cell currents, whereby a simple and precise process is used which is relatively free from disturbances.

SUMMARY OF THE INVENTION

The process according to the invention consists of determining and correcting the position of a point P on the track relative to a reference line defined by two points A and B joined by a bundle of laser beams emitted at A which projects the shadow of a screen linked with point P onto a target at point B and provided with photoelectric cells, characterised in that the target is swept by rotating the laser beam about an axis parallel to the reference plane and passing through the point A and in that the target sweeping times are measured and by treating these sweeping times the position of the point P is determined relative to the reference line AB.

It is therefore sufficient for the reference line AB to be always contained within the thickness of the sweeping beam which obviates the delicate aiming and orientation of the emitter onto the target centre. This advantage can be further increased by giving the sweeping beam a sufficient thickness to take account of a possible inclination of the target relative to the plane of said beam.

Moreover by replacing the differential measurement of the amplitude of the signals by the measurement of the excitation times of the cells all the disturbances affecting the cells are substantially eliminated.

The simplest case of applying the process forming the object of the present invention consists of determining the position of point P of the track by placing the screen at a point H coinciding with the point P and comparing the sweeping times of the target on either side of the shadow produced on the screen. If these points are equal this signifies that the screen i.e. point P, is aligned with the reference line AB, whilst if the sweeping time of the left hand portion is shorter than that of the right hand portion this indicates that the point P is located too far to the left and vice-versa.

To correct the position of this point P, a known operation consisting of moving the track with the aid of power equipment in order to bring said point P into alignment with the reference line AB, it is only necessary to effect the comparison of said sweeping times by electrical signals having appropriate characteristics to control the track moving power equipment.

When the amplitude of the variation between point P and the straight line AB risks causing the non-hiding of the target by the shadow of the screen another process is used to determine the position of point P of the track relative to said reference line AB consisting of maintaining the screen at a point H on the reference line AB for example with the aid of a translation servo-mechanism connecting it to the point P of the track said servo-mechanism being controlled by the comparison signal of the sweeping times of the target on either side of the shadow produced of said screen, then measuring the variation $e$ between the point H where the screen is located and point P of the track.

In the alignments to correct the position of the point P of the track according to this variant the measured value of the variation e is transformed into electrical signals permitting the control of the track moving power equipment.

When it is a question of correcting the position of a point P on a curving track i.e. according to the arc of circle APB, the screen can obviously not be located at point P because its shadow produced could be located outside the target. The screen is then placed, as stated hereinbefore, at the point H and aligned with the reference line AB by means of the comparison signal of the sweeping times of the target on either side of the shadow produced on the screen. In this case the position error of point P relative to its theoretical position P' on the arc AP'B is the difference between the length of the true camber HP and the length of the theoretical camber $HP' = f$ which is determined as a function of the given radius of curvature ($r$) and the length of the cord AB.

This determination of the camber f is simple provided that the distances separating the points A and B from point H i.e. the emitter and the screen target are constant e.g. when these three elements are connected to the correcting machine and move simultaneously therewith. However, experience has shown that it is preferable to have the emitter at a fixed point A on the track. In this case the distance between the point A of the emitter and the point H of the screen varies as the machine advances and therefore for a same radius of curvature ($r$) the camber $f$ varies as a function of the distance variations AH and the chord AB, whilst HB remains a constant, the screen at H and the target at B being connected to the machine. As a result for each movement of the machine it is necessary to recalculate the new chord AB to determine the new camber.

The sweeping system according to the invention is advantageously applied in this case for the determination of the sag $f$ as it permits at any time the measurement of the length of the chord AB by measuring the sweeping time from one side to the other of the screen. In fact given that the target width as well as the angular sweeping rate are known and constant the length AB is equal to the quotient of the division of a constant by the total sweeping time from one chord to the other of the target.

To correct a curving track the displacement of the point P to be corrected is controlled by means of the measured value of the distance between the point H on the straight line AB where the screen is located and the point P of the track after, as indicated hereinbefore, subtracting the theoretical camber calculated at this point.

DESCRIPTION OF SPECIFIC EMBODIMENTS

The invention also comprises a device for performing the process described hereinbefore. The following description together with the drawings accompanying the same clearly explain the realisation and operation thereof.

FIG. 1 is a diagram of the alignment device according to the invention,

FIG. 2 shows wave trains whereof the length is measured,

FIG. 3 is a diagram of the device for performing corrections in curves.

In a non-limitative embodiment relative to the alignment the source of coherent laser beams 1 (FIG. 1) is mounted on a trolley which is moved on the absolute reference base AB by remote control. This source 1 emits, at 90° from the general orientation of the measuring base, a radiation 2 which is received by a prism 3 mounted at point A on a substantially vertical axis and which rotates at a constant angular velocity $\omega$. The laser beam leaves the prism at a substantially vertical plane and with an aperture which is just sufficient in height to illuminate the target 6 placed at point B taking account of the possible inclination of the emitter and target on the ground. The rotary radiation plane is angularly limited in its sweep by a diaphragm 4 but in such a way that it reliably sweeps the target 6. The latter is provided with a rectilinear row of photoelectric cells 6a, the position of which (this rectilinear row) does not need to be perpendicular to the source, and the inclination of which on the horizontal plane can itself vary within relatively wide limits, whereby the operation of the device remains linear by projection. The centre of the target represents point B.

At a point H located on the straight line AB is placed a screen 5 masking the complete thickness of the beam during its passage. This screen is connected to the track via a translation mechanism which is not shown which permits movement transverse to the track with the object of either causing point H to coincide with point P or to keep it in alignment with the reference line AB. In the latter case it is advantageous to control the translation mechanism by a servo-mechanism controlled by the signal resulting from the comparison of the sweeping times. The servo-mechanism can be a motor to position the screen operated in the two running directions by an analogical electronic signal previously transformed by an analogical digital converter, the digital information being obtained by the difference of the illumination times of the cells. When the illumination time of photoelectric cells of target 6 is the same on either side of the shadow 5a produced on screen 5 point H where the screen is positioned is precisely aligned with the emitter A and the receiver B.

To measure and compare these illumination times one uses an electronic clock started by the electric signals emitted by the cells through a discriminating amplifier 14 to either count and compare the number of oscillations in two successive wave trains or to compare en bloc the length of the wave trains by comparing their electrical energy. As the cells permanently supply a particular parasitic current 8 due inter alia to ambient light a sufficient amplitude threshold 9 is provided for the amplifier 12 to eliminate the parasitic level and the residual amplitude 10 is used, even if it is not constant, to modulate by all or nothing a generator 13 of oscillations of constant frequency and amplitude. In this way wave trains 11 are obtained of constant amplitude and frequency independent of the parasites and disturbances indicated hereinbefore.

FIG. 2 illustrates the process :

$t_1$ and $t_3$ are the respective illumination times on either side of the screen shadow. If $t_1/t_3 = 1$ this signifies that the alignment of point P is exact. If $t_1/t_3 < 1$ this signifies that point P is located too far to the left and if $t_1/t_3 > 1$ this signifies that point P is too far to the right.

For each sweeping of the target by the laser beam the comparison between the illumination times of the cells on either side of the shadow dispensed by the screen onto the target allows to infer the direction of the shifting of the intermediary point H until its alignment and also to bring under control the position of the said point H as already said by means of an automatic device keeping it on the straight line of reference AB.

Such a system inserted in a regulation loop can be used for the automatic correction of the alignment as well as for leveling both roads and railway tracks.

When determining point by point a curving track outline the same device permits very rapid and precise working. The angular velocity $\omega$ of sweeping the target is constant, therefore the linear velocity v of sweeping the target is :

$v = \omega R = 2\pi \cdot Rn$, i.e., proportional to the radius $R$ which is only the chord AB of the arc APB. The width $b$ of the target is constant, therefore the target sweeping time $t_b$ is inversely proportional to the distance AB, and the counting of the number of oscillations within the width of the target gives a way of evaluating the distance AB. The target sweeping time is :

$t_b = b/v$ or $t_b = b/\omega AB$ and therefore $AB = b/\omega\, t_b$ $\omega$ and $b$ being constants; they can be combined at $k$ to obtain $AB = k/t_b$, formula wherein k is the constant of the installation and which takes account of the target width and the sweeping velocity whilst $t_b = t_1 + t_2 + t_3$.

Time $t_4$ is the dead time between two successive sweeps i.e. a relaxation time during which the electronic discriminator returns to zero.

The determination and point by point measuring processes for a curve are therefore the same as described relative to the alignment of a point P of the track, except that at each point the camber $f$(FIG. 3) which has been previously calculated must be added.

In the description mention has only been made of one reference plane containing the line AB but it is obvious that if it is desired to operate simultaneously in the two planes corresponding respectively to the lining and leveling of a track two systems identical to that described can be used simultaneously in the two orthogonal planes. So as to differentiate the reception of the signals one of the rows of receiving cells can be protected by a polarising plate.

What I claim as my invention is:

1. A method for checking and/or correcting a railway track by determining the position of a point P of said track relative to a reference plane containing a reference line defined by two points A and B situated respectively on either side of the normal dropped from point P onto said line, and wherein coherent rays passing through the point A are used to illuminate a target sensitive to these rays positioned at point B, said rays being intercepted by a screen connected to point P whereof the shadow produced is projected onto the target, in which the target B is swept by rotating a laser beam which is the source of said coherent rays about an axis parallel to the reference plane and passing through the point A and the target sweep time is measured and the position of point P relative to the reference line AB is determined from said sweep time.

2. Method according to claim 1, wherein the position of point P of the track is determined by placing the screen at a point H coinciding with point P and by comparing the target sweep times on either side of the shadow produced on the screen.

3. Method according to claim 2, wherein the displacement of point P to be corrected is controlled by means of the comparison signal of the target sweep times on either side of the shadow produced on the screen.

4. Method according to claim 1, wherein the position of point P of the track is determined by maintaining the screen at a point H located on the line AB by means of a comparison signal of the target sweep times on either side of the shadow produced on said screen and measuring the distance between the point H where the screen is located and the point P on the track.

5. Method according to claim 4, wherein during the alignments the displacement of point P to be corrected is controlled by means of the measured value of the distance between point H where the screen is located and point P of the track.

6. Method according to claim 4, in which in curves the displacement of point P to be corrected is controlled by means of the measured value of the distance between point H on the line AB where the screen is located and point P of the track after which the theoretical camber calculated at this point has been subtracted as a function of a given radius and of the length of chord AB of arc APB, said length being determined by measuring the total sweep time from one side to the other.

7. Apparatus for checking and/or correcting a railway track by determining the position of a point P of said track relative to a reference plane containing a reference line defined by two points A and B situated respectively on either side of the normal dropped from point P onto said line, comprising a source of coherent rays such as lasers, an optical device cencentrating, delimiting and reflecting the beam from the point A to point B and thus defining a reference line, point B comprising a target equipped with photoelectric cells whereon a screen connected to point P projects its shadow, an electronic apparatus for the treatment and discrimination of currents emitted by the cells supplying a signal for checking and/or correcting the position of the track, characterised in that the source of rays is positioned so as to emit at about 90° from the direction A-B radiation which is received by a reflector mounted on an axis at point A and rotating at a constant angular velocity, said radiation leaving the reflector according to an aperture angle sweep plane limited by a diaphragm which is sufficient to sweep the whole target B which extends approximately in a rectilinear manner perpendicular to the rotation axis of the reflector and in that the electronic apparatus is operated so as to measure the excitation times of the cells.

8. Apparatus according to claim 7, wherein said rotating reflector comprises a prism of transparent material giving several sweeps per rotation.

9. Apparatus according to claim 7, wherein said reflector comprises a prism whose reflecting surfaces give several sweeps per rotation.

10. Apparatus according to claim 7, wherein said electronic apparatus transforms the current emitted by the cells into wave trains having a sufficiently high constant frequency to permit with the aid of an electronic discriminator the determination of the position of point P from the excitation times of the cells on either side of the shadow produced on the screen.

11. Apparatus according to claim 7, wherein the electronic discrimination apparatus is operated so as to emit a signal resulting from the comparison of the respective excitation times of the cells on either side of the shadow produced on the screen.

12. Apparatus according to claim 7 wherein the electronic discrimination apparatus is operated so as to measure the total sweep time from one side to the other of the target and deduce therefrom the length of chord AB which is inversely proportional to the target sweep time.

* * * * *

UNITED STATES PATENT OFFICE
CERTIFICATE OF CORRECTION

Patent No. 3,775,618            Dated November 27, 1973

Inventor(s) Robert Rousse

It is certified that error appears in the above-identified patent and that said Letters Patent are hereby corrected as shown below:

Column 1, assignee's name - "Cannon, Inc." should be -- Canron, Inc. --

Signed and sealed this 3rd day of September 1974.

(SEAL)
Attest:

McCOY M. GIBSON, JR.                C. MARSHALL DANN
Attesting Officer                   Commissioner of Patents